United States Patent
Nakada et al.

(10) Patent No.: US 10,392,986 B2
(45) Date of Patent: Aug. 27, 2019

(54) EXHAUST PURIFICATION SYSTEM, AND CONTROL METHOD FOR EXHAUST PURIFICATION SYSTEM

(71) Applicant: ISUZU MOTORS LIMITED, Tokyo (JP)

(72) Inventors: Teruo Nakada, Yokohama (JP); Takayuki Sakamoto, Fujisawa (JP); Daiji Nagaoka, Kamakura (JP)

(73) Assignee: ISUZU MOTORS LIMITED, Tokyo (JP)

( * ) Notice: Subject to any disclaimer, the term of this patent is extended or adjusted under 35 U.S.C. 154(b) by 16 days.

(21) Appl. No.: 15/557,445

(22) PCT Filed: Mar. 11, 2016

(86) PCT No.: PCT/JP2016/057844
§ 371 (c)(1),
(2) Date: Sep. 11, 2017

(87) PCT Pub. No.: WO2016/143902
PCT Pub. Date: Sep. 15, 2016

(65) Prior Publication Data
US 2018/0112573 A1    Apr. 26, 2018

(30) Foreign Application Priority Data

Mar. 11, 2015 (JP) ................... 2015-048308
Mar. 11, 2015 (JP) ................... 2015-048309

(51) Int. Cl.
*F01N 3/08*    (2006.01)
*F01N 3/20*    (2006.01)
(Continued)

(52) U.S. Cl.
CPC .......... *F01N 3/2033* (2013.01); *B01D 46/42* (2013.01); *B01D 53/94* (2013.01); *B01D 53/96* (2013.01);
(Continued)

(58) Field of Classification Search
CPC ........ B01D 46/42; B01D 53/94; B01D 53/96; F01N 3/021; F01N 3/023; F01N 3/0253;
(Continued)

(56) References Cited

U.S. PATENT DOCUMENTS

2004/0250535 A1* 12/2004 Miura ................... F01N 3/0814
60/285
2005/0022506 A1   2/2005 Nishizawa et al.
(Continued)

FOREIGN PATENT DOCUMENTS

CN        104246185 A      12/2014
DE     602004001290 T2      6/2007
(Continued)

OTHER PUBLICATIONS

Notification of Reasons for Refusal for Japanese Patent Application No. 2015-048308 dated Oct. 30, 2018, 8 pages.
(Continued)

*Primary Examiner* — Brandon D Lee
(74) *Attorney, Agent, or Firm* — Procopio, Cory, Hargreaves & Savitch LLP

(57) ABSTRACT

An exhaust purification system includes a NOx reduction catalyst which is provided on an exhaust passage of an internal combustion engine, a SOx purging control module for executing a SOx purging control for restoring the NOx reduction catalyst from sulfur poisoning by increasing a temperature of the exhaust gas to a first target temperature at which SOx are desorbed through an injection system control to increase a fuel injection amount, a prohibition
(Continued)

module for prohibiting an execution of the SOx purging control according to an operating state of the internal combustion engine, and a temperature retention mode control module for executing a temperature retention mode control for maintaining the temperature of the exhaust gas at a second target temperature which is lower than the first target temperature by controlling the fuel injection amount during a period of time during which the SOx purging control is prohibited.

11 Claims, 11 Drawing Sheets

(51) Int. Cl.
| | | |
|---|---|---|
| *F01N 3/36* | (2006.01) | |
| *B01D 46/42* | (2006.01) | |
| *B01D 53/94* | (2006.01) | |
| *B01D 53/96* | (2006.01) | |
| *F01N 3/021* | (2006.01) | |
| *F01N 3/023* | (2006.01) | |
| *F01N 3/025* | (2006.01) | |
| *F01N 3/035* | (2006.01) | |
| *F02D 41/02* | (2006.01) | |

(52) U.S. Cl.
CPC ............ *F01N 3/021* (2013.01); *F01N 3/023* (2013.01); *F01N 3/0253* (2013.01); *F01N 3/035* (2013.01); *F01N 3/0814* (2013.01); *F01N 3/0842* (2013.01); *F01N 3/0885* (2013.01); *F01N 3/208* (2013.01); *F01N 3/36* (2013.01); *F02D 41/0235* (2013.01); *F02D 41/0245* (2013.01); *F01N 2550/03* (2013.01); *F01N 2610/03* (2013.01); *F01N 2900/0422* (2013.01); *F01N 2900/1404* (2013.01); *F01N 2900/1602* (2013.01); *F01N 2900/1612* (2013.01); *Y02T 10/24* (2013.01)

(58) Field of Classification Search
CPC ...... F01N 3/035; F01N 3/0814; F01N 3/0842; F01N 3/0885; F01N 3/2033; F01N 3/208; F01N 3/36; F01N 2550/03; F01N 2610/03; F01N 2900/0422; F01N 2900/1404; F01N 2900/1602; F01N 2900/1612; F02D 41/0245

See application file for complete search history.

(56) References Cited

U.S. PATENT DOCUMENTS

| | | |
|---|---|---|
| 2005/0050881 A1 | 3/2005 | Toshioka et al. |
| 2005/0109014 A1 | 5/2005 | Hayashi |
| 2007/0000237 A1 | 1/2007 | Toshioka et al. |
| 2007/0151231 A1* | 7/2007 | Rinaldi ............... F01N 3/0211 60/286 |
| 2009/0049824 A1 | 2/2009 | Kojima et al. |
| 2009/0087364 A1* | 4/2009 | Odajima ........... B01D 53/9459 423/213.2 |
| 2010/0101217 A1 | 4/2010 | Ohashi et al. |
| 2015/0135681 A1 | 5/2015 | Schmitt et al. |

FOREIGN PATENT DOCUMENTS

| | | |
|---|---|---|
| EP | 1365117 A2 | 11/2003 |
| EP | 2148054 A1 | 1/2010 |
| EP | 2647815 A1 | 10/2013 |
| JP | 2005-105828 A | 4/2005 |
| JP | 2005-133562 A | 5/2005 |
| JP | 2005-146979 A | 6/2005 |
| JP | 2005-273573 A | 10/2005 |
| JP | 2008-064063 A | 3/2008 |
| JP | 2008-069728 A | 3/2008 |
| JP | 2008-231927 A | 10/2008 |
| JP | 2009-047086 A | 3/2009 |
| JP | 2010-144565 A | 7/2010 |

OTHER PUBLICATIONS

Notification of Reasons for Refusal for Japanese Patent Application No. 2015-048309 dated Oct. 30, 2018, 9 pages.
International Search Report and Written Opinion for PCT App No.: PCT/JP2016/057844 dated Jun. 7, 2016, 11 pgs.
Extended European Search Report for related EP App No.: 16761867.7 dated Jul. 30, 2018, 8 pgs.
First Office Action for related CN App No: 201680014777.0 dated Mar. 29, 2019, 18 pgs.

* cited by examiner

FIG. 7

| | FILTER REGENERATION CONTROL | TEMPERATURE RETENTION MODE CONTROL | SOx PURGING LEAN CONTROL | SOx PURGING RICH CONTROL | CONDITIONS |
|---|---|---|---|---|---|
| PATTERN A | $F_{DPF}=0$ ○ → | $F_{SPK}=1$ ● | | | OUT OF SOx PURGING ENABLING AREA |
| PATTERN B | $F_{DPF}=0$ ○ → | $F_{SPK}=0$ ○ → | $F_{SP}=1$ ● | | WITHIN SOx-PURGING ENABLING AREA |
| PATTERN C | | | $F_{SPR}=0$ ○ ← | $F_{SPK}=1$ ● | WITHIN SOx-PURGING ENABLING AREA |
| PATTERN D | | $F_{SPK}=1$ ● ← | $F_{SP}=0$ ○ | | OUT OF SOx PURGING ENABLING AREA |

FIG. 8

| | LEAN-BURN OPERATION | TEMPERATURE RETENTION MODE CONTROL | SOx PURGING LEAN CONTROL | SOx PURGING RICH CONTROL | CONDITIONS |
|---|---|---|---|---|---|
| PATTERN A | ← | | | $F_{SPR}=0$ ○ | $SA \leq SA_1$ |
| PATTERN B | ← | | | $F_{SPR}=0$ ○ | $T_{SPK\_sum} \geq T_{SPR\_Lim1}$ |
| PATTERN C | ← | $F_{SPK}=0$ ○ | | | $T_{SPK\_sum} \geq T_{SPK\_Lim2}$ |
| PATTERN D | ← | $F_{SPK}=0$ ○ | | | $SA \leq SA_1$ and $T_{SPK\_sum} \geq T_{SPK\_Lim3}$ |
| PATTERN E | ← | $F_{SPK}=0$ ○ | $F_{SP}=0$ ○ | $F_{SPR}=0$ ○ | $T_{SPK\_sum} \geq T_{\_Lim4}$ |
| PATTERN F | ← | $F_{SPK}=0$ ○ | | | $T_{SPK\_sum} \geq T_{\_Lim5}$ |

EXHAUST PURIFICATION SYSTEM, AND CONTROL METHOD FOR EXHAUST PURIFICATION SYSTEM

CROSS-REFERENCE TO RELATED APPLICATIONS

This application is a U.S. National Stage entry of PCT Application No. PCT/JP2016/057844, filed on Mar. 11, 2016, which claims priority to Japanese Patent Application Nos. 2015-048308, filed Mar. 11, 2015, and 2015-048309 filed Mar. 11, 2015, the contents of which are incorporated herein by reference.

TECHNICAL FIELD

The present invention relates to an exhaust purification system and a control method for an exhaust purification system.

BACKGROUND ART

Conventionally, a NOx storage reduction catalyst has been known as a catalyst for reducing and purifying nitrogen compound (NOx) in exhaust gas discharged from an internal combustion engine. The NOx storage reduction catalyst occludes NOx in exhaust gas when the exhaust gas is in a lean atmosphere, while when the exhaust gas is in a rich atmosphere, the NOx storage catalyst makes the occluded NOx harmless by reducing and purifying the NOx with hydrocarbons contained in the exhaust gas for discharge into the atmosphere.

In addition, the NOx storage reduction catalyst also occludes sulfur oxides (hereinafter, referred to as SOx) contained in exhaust gas. When an amount of SOx occluded in the NOx storage reduction catalyst is increased, a problem is caused that the NOx purifying capacity of the NOx storage reduction catalyst is reduced. Because of this, in a case where the SOx occlusion amount reaches a predetermined amount, in order to recover the NOx storage reduction catalyst from the sulfur poisoned state by desorbing the occluded SOx from the NOx storage reduction catalyst, a so-called SOx purging operation needs to be carried out periodically in which unburned fuel is supplied to an upstream oxidation catalyst through a post injection or an exhaust pipe injection to increase the temperature of exhaust gas to a SOx desorption temperature (for example, refer to Patent Literature 1).

PRIOR ART LITERATURES

Patent Literatures

Patent Literature 1: JP-A-2009-47086
Patent Literature 2: JP-A-2008-64063

SUMMARY OF THE INVENTION

Problem that the Invention is to Solve

When SOx purging is executed in a state where the engine revolution speed is very high or a fuel injection amount is very much, there is a possibility that a drastic increase in engine temperature is called for. In such a state, it is preferable to prohibit or interrupt the execution of SOx purging.

However, when the post injection or the exhaust pipe injection is stopped completely, the catalyst temperature is reduced, and the fuel consumption amount becomes excessive when the SOx purging is resumed thereafter, there being a problem that an excessive increase in catalyst temperature and a deterioration in fuel consumption are called for.

An exhaust purification system and a control method for an exhaust purification system disclosed in the present invention are intended to prevent effectively an excessive increase in catalyst temperature and a deterioration in fuel consumption when a SOx purging is resumed.

Means for Solving the Problem

A system disclosed in the present invention includes a NOx reduction catalyst which is provided on an exhaust passage of an internal combustion engine to reduce and purify NOx contained in exhaust gas, catalyst regeneration means for executing a catalyst regeneration control for restoring the NOx reduction catalyst from sulfur poisoning by increasing a temperature of the exhaust gas to a predetermined first target temperature at which sulfur oxides are desorbed through an injection system control to increase at least a fuel injection amount, prohibition means for prohibiting an execution of the catalyst regeneration control according to an operating state of the internal combustion engine, and temperature retention control means for executing a catalyst temperature retention control for maintaining the temperature of the exhaust gas at a predetermined second target temperature which is lower than the first target temperature by controlling the fuel injection amount during a period of time during which the execution of the catalyst regeneration control is prohibited by the prohibition means.

A control method for an exhaust purification system disclosed in the present invention is a control method for an exhaust purification system which includes a NOx reduction catalyst which is provided on an exhaust passage of an internal combustion engine to reduce and purify NOx contained in exhaust gas which flows in the exhaust passage, the method comprising a catalyst regeneration process of executing a catalyst regeneration control for restoring the NOx reduction catalyst from sulfur poisoning by increasing a temperature of the exhaust gas to a predetermined first target temperature at which sulfur oxides contained in the exhaust gas are desorbed through an injection system control which controls an injection system, which is configured to inject a fuel, to increase at least a fuel injection amount, a prohibition process of prohibiting an execution of the catalyst regeneration control according to an operating state of the internal combustion engine, and a temperature retention control process of executing a catalyst temperature retention control for maintaining the temperature of the exhaust gas at a predetermined second target temperature which is lower than the first target temperature by controlling the fuel injection amount during a period of time during which the execution of the catalyst regeneration control is prohibited by the prohibition process.

Advantageous Effect of the Invention

According to the exhaust purification system and the control method for an exhaust purification system disclosed in the present invention, it is possible to prevent effectively an excessive increase in catalyst temperature and a deterioration in fuel consumption when the SOx purging is resumed.

BRIEF DESCRIPTION OF DRAWINGS

FIG. 7 is a chart illustrating a prohibition process of the SOx purging control according to the embodiment of the present invention.

FIG. 8 is a chart illustrating an ending process of a temperature retention mode control and the SOx purging control according to the embodiment of the present invention.

MODE FOR CARRYING OUT THE INVENTION

Hereinafter, an exhaust purification system according to an embodiment disclosed by the present invention will be described based on the accompanying drawings.

Figure 1:
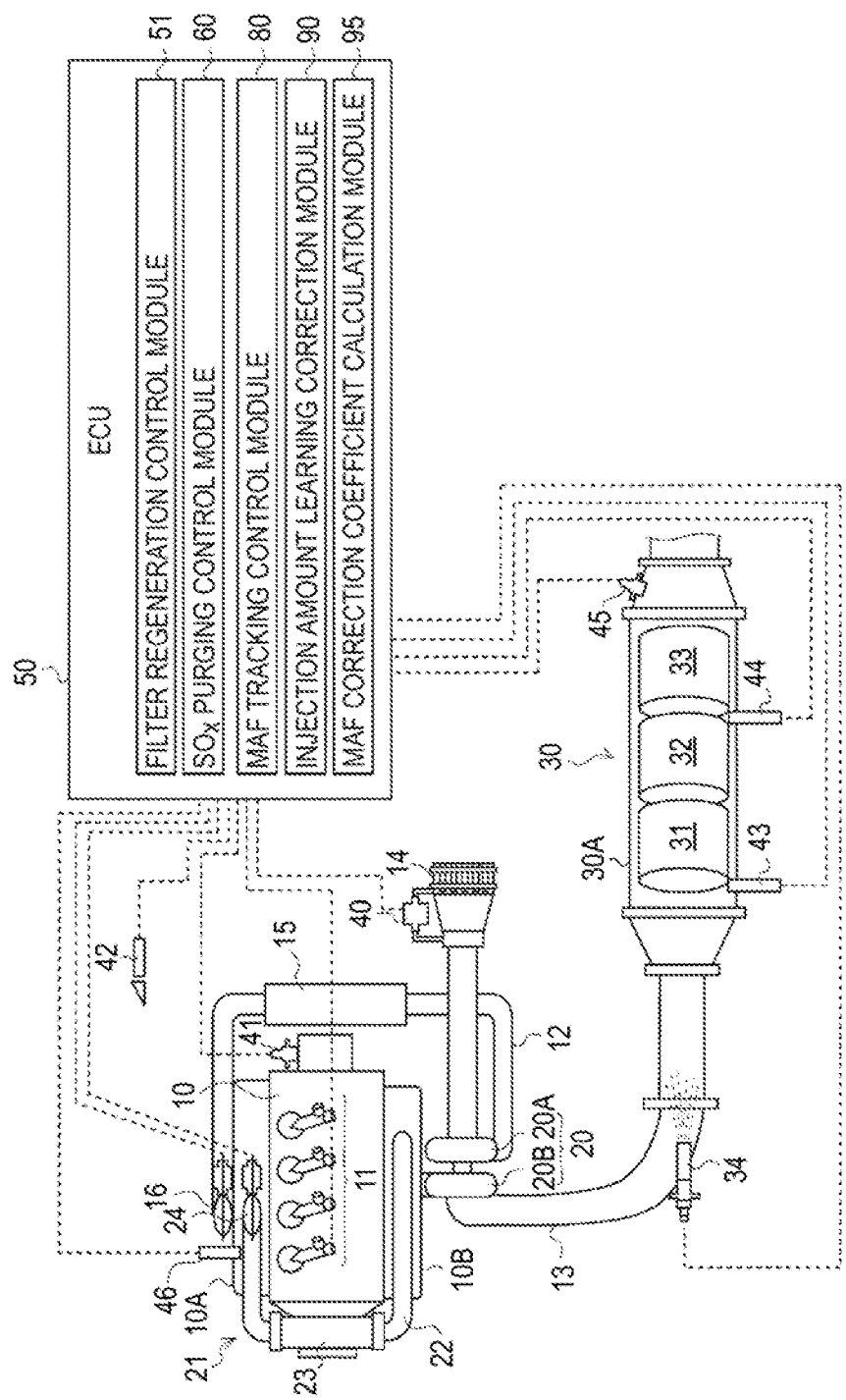
FIG. 1 is a schematic diagram showing an overall configuration of an exhaust purification system according to an embodiment of the present invention.

As shown in FIG. 1, injectors 11 are provided individually on cylinders of a diesel engine (hereinafter, referred to simply as an engine) 10 to inject highly pressurized fuel accumulated under pressure in a common rail, not shown, directly into the individual cylinders. A fuel injection amount and a fuel injection timing for these individual injectors 11 are controlled according to an instruction signal inputted from an electronic control unit (hereinafter, referred to as an ECU) 50.

An intake passage 12 through which fresh air is introduced is connected to an intake manifold 10A of the engine 10, and an exhaust passage 13 through which exhaust gas is guided to be discharged to an exterior portion is connected to an exhaust manifold 10B. An air cleaner 14, an intake air flow sensor (hereinafter, referred to as MAF sensor) 40, a compressor 20A of a variable capacity supercharger 20, an inter-cooler 15, an intake throttle valve 16 and the like are provided along the intake passage 12 sequentially in that order from an upstream side of an intake air flow. A turbine 20B of the variable capacity supercharger 20 and an exhaust gas after-treatment apparatus 30 and the like are provided along the exhaust passageway 13 sequentially in that order from an upstream side of an exhaust gas flow. An engine revolution speed sensor 41, an accelerator opening sensor 42, and a boost pressure sensor 46 are attached to the engine 10.

In the description of this embodiment, the MAF sensor 40 for measuring and detecting a mass air flow is used as an intake air flow sensor for measuring and detecting an intake air flow (Suction air flow) of the engine. However, an air flow sensor of a different type from the MAF sensor 40 or a device which replaces the air flow sensor may be used, provided that an engine suction air flow can be measured and detected by those devices.

An EGR (Exhaust Gas Recirculation) device 21 includes an EGR passageway 22 which connects the exhaust manifold 10B and the intake manifold 10A, an EGR cooler 23 for cooling EGR gas and an EGR valve 24 for controlling an EGR amount.

The exhaust gas after-treatment apparatus 30 includes in a case 30A an oxidation catalyst 31, a NOx storage reduction catalyst 32, and a particulate filter (hereinafter, referred to simply as a filter) 33 which are arranged sequentially in that order from an upstream side of an exhaust gas flow. In addition, an exhaust pipe injector 34 for injecting unburned fuel (mainly hydrocarbons (HC)) into the exhaust passage 13 in response to an instruction signal inputted from the ECU 50 is provided on a portion of the exhaust passage 13 which is situated upstream of the oxidation catalyst 31.

The oxidation catalyst 31 is formed, for example, of a ceramic carrier of a honeycomb structure which carries an oxidation catalyst component on a surface thereof. When supplied with unburned fuel through a post injection by the exhaust pipe injector 34 or the injectors 11, the oxidation catalyst 31 oxidizes the unburned fuel to increase the temperature of exhaust gas.

The NOx storage reduction catalyst 32 is formed, for example, of a ceramic carrier of a honeycomb structure which carries an alkaline metal on a surface thereof. This NOx storage reduction catalyst 32 occludes NOx in exhaust gas when an air-fuel ratio of the exhaust gas is in a lean state, and when the air-fuel ratio of the exhaust gas is in a rich state, the NOx storage reduction catalyst 32 reduces and purifies the occluded NOx with a reducing agent (HC) contained in the exhaust gas.

The filter 33 is formed, for example, by disposing a number of cells which are defined by porous bulkheads along a flowing direction of exhaust gas and sealing up upstream ends and downstream ends of the cells in an alternate fashion. The filter 33 collects PMs (particulate matters) in exhaust gas in fine holes and on surfaces of the bulkheads and executes a so-called forced filter regeneration in which the collected PMs are burned to be removed when an estimated amount of accumulation of collected PMs reaches a predetermined amount. The forced filter regeneration is executed by supplying unburned fuel to the oxidation catalyst 31, which is disposed at an upstream side, through an exhaust pipe injection or a post injection and raising the temperature of exhaust gas flowing into the filter 33 up to a PM combustion temperature.

A first exhaust gas temperature sensor 43 is provided upstream of the oxidation catalyst 31 and detects a temperature of exhaust gas that flows into the oxidation catalyst 31. A second exhaust gas temperature sensor 44 is provided between the NOx storage reduction catalyst 32 and the filter 33 to detect a temperature of exhaust gas that flows into the filter 33. A NOx/lambda sensor 45 is provided downstream of the filter 33 and detects a NOx value and a lambda value (hereinafter, referred also to as an air exceeding ratio) of exhaust gas which passes through the NOx storage reduction catalyst 32.

The ECU 50 performs various controls of the engine 10 and the like and is made up of a known CPU, ROM, RAM, input port and output port. To enable the ECU 50 to perform the various controls, sensor values are inputted into the ECU 50 from the sensors 40 to 46. The ECU 50 has a filter regeneration control module 51, a SOx purging control module 60, a MAF tracking control module 80, an injection amount learning correction module 90, and a MAF correction coefficient calculation module 95 as part of its functional elements. These functional elements are described as being incorporated in the ECU 50, which is integrated hardware. However, some of the functional elements can also be provided on separate hardware.

[Filter Regeneration Control]

Figure 2:
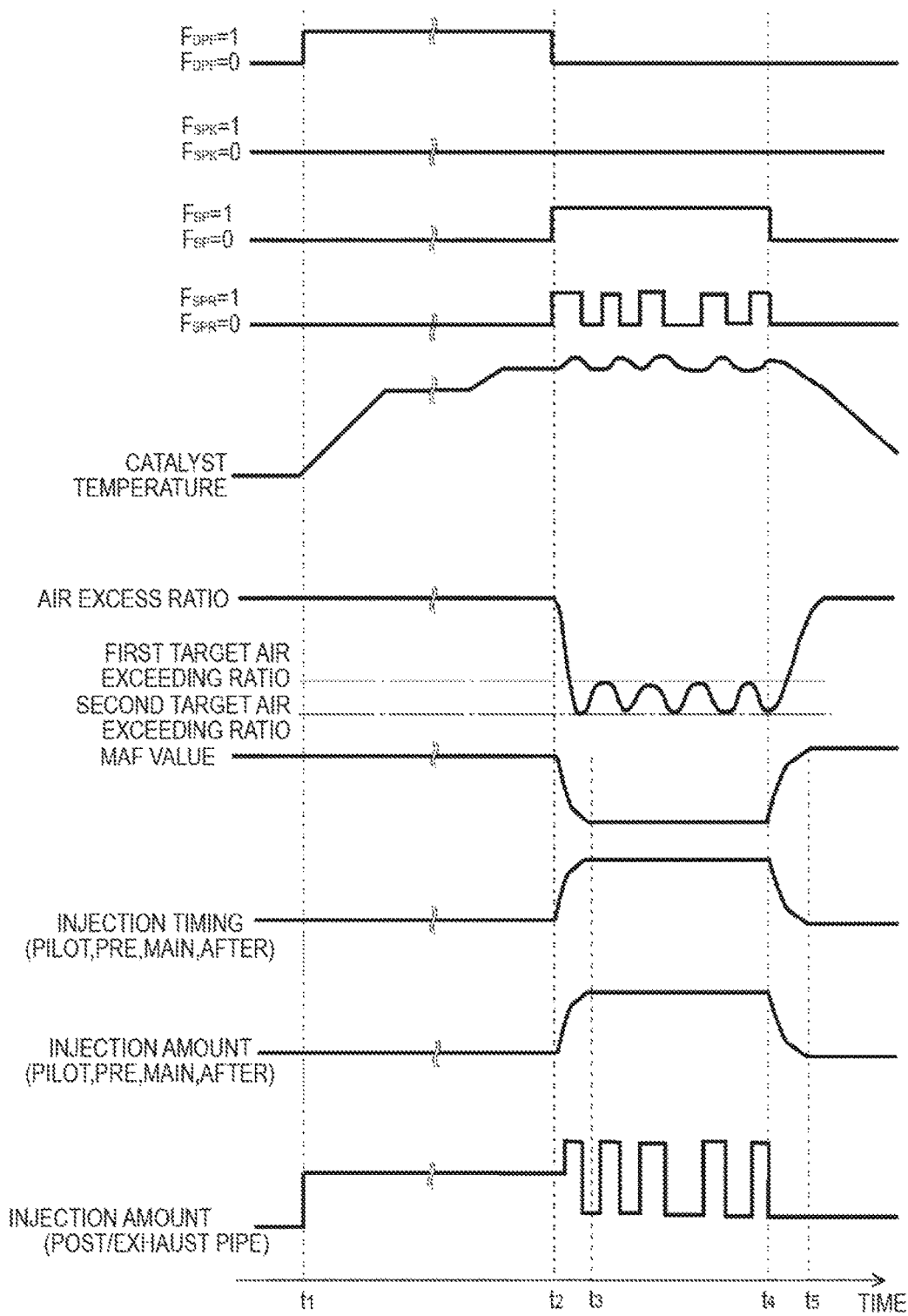
FIG. 2 is a timing chart illustrating a SOx purging control according to the embodiment of the present invention.

The filter regeneration control module 51 estimates a PM accumulation amount in the filter 33 from a mileage of the vehicle or a differential pressure between a front and rear of the filter which is detected by a differential pressure sensor, not shown, and sets on a forced regeneration flag $F_{DPF}$ ($F_{DPF}$=1) to start a filter regeneration control when the estimated PM accumulation amount exceeds an upper limit threshold (refer to a time $t_1$ in FIG. 2). The filter regeneration control is executed by feedback controlling an exhaust pipe injection amount or a post injection amount based on a predetermined PM combustion temperature (for example, about 550° C.). The filter regeneration control ends by setting off the forced regeneration flag $F_{DPF}$ when the estimated PM accumulation value is lowered to a predetermined lower threshold (a determination threshold) which indicates that the PM are burned and removed (refer to a time $t_2$ in FIG. 2). The determination threshold that sets off the forced regeneration flag $F_{DPF}$ may be based on an upper limit elapsing time or an upper limit accumulated injection amount from a start of a forced filer regeneration ($F_{DPF}$=1).

[SOx Purging Control]

The SOx purging control module 60 is a catalyst regeneration means disclosed by the present invention and executes a control (hereinafter, this control will be referred to as a SOx purging control) to restore the NOx storage reduction catalyst 32 from SOx poisoning by enriching exhaust gas to raise the temperature of the exhaust gas to a SOx desorption temperature (for example, about 600° C.). The SOx purging control is started when a SOx purge flag $F_{SP}$ is set on in such a state that the filter regeneration flag $F_{DPF}$ is set off as a result of ending of the filter regeneration control and further that a temperature retention mode flag $F_{SPK}$, which will be described later, is off (refer to the time $t_2$ in FIG. 2).

Figure 3:
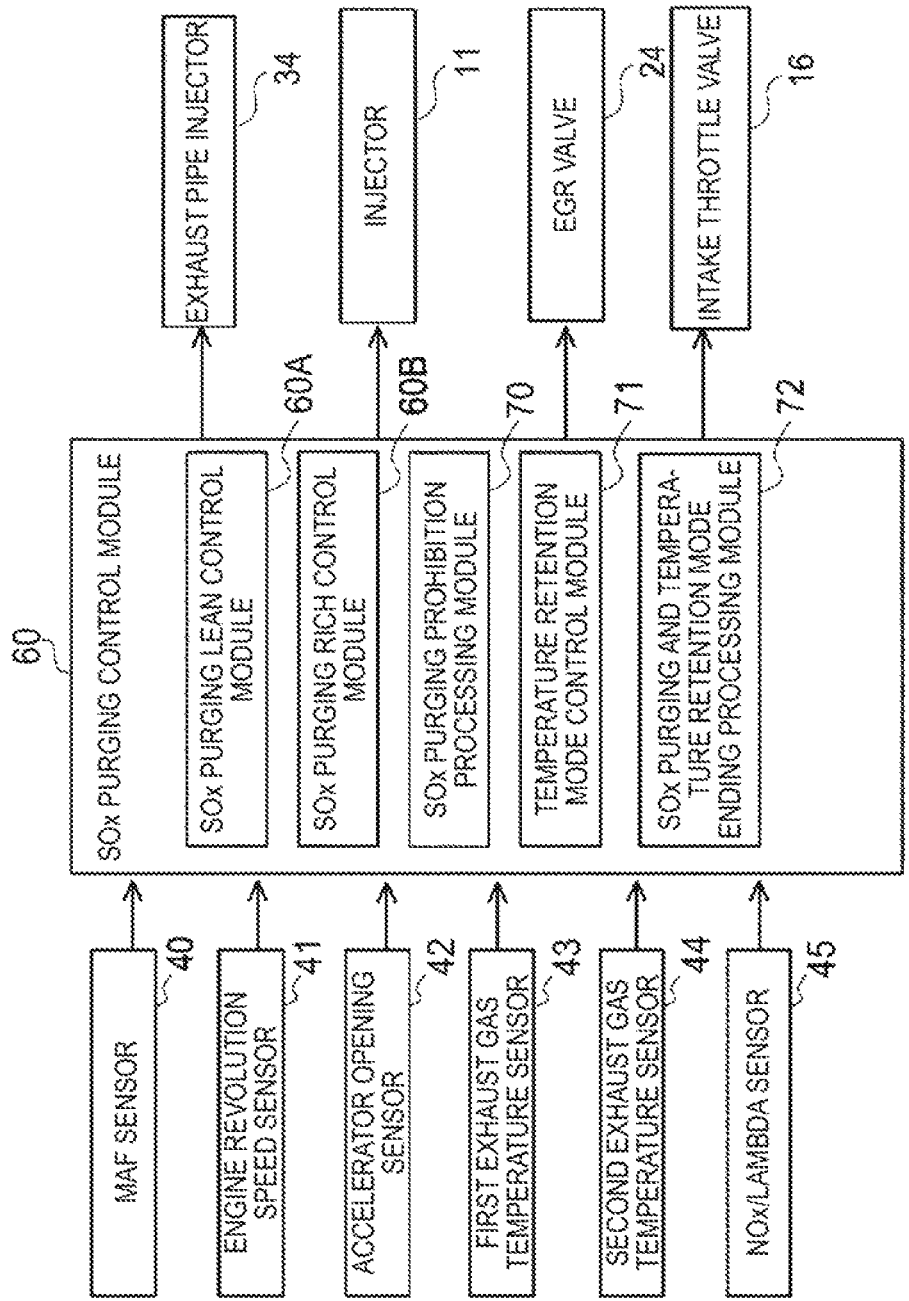
FIG. 3 is a functional block diagram showing a SOx purging control module according to the embodiment of the present invention.

In this embodiment, the SOx purging control module 60 includes, as shown in FIG. 3, a SOx purging lean control module 60A, a SOx purging rich control module 60B, a SOx purging prohibition processing module 70, a temperature retention mode control module 71, and a SOx purging and temperature retention mode ending processing module 72 as part of its functional elements. Hereinafter, these functional elements will be described in detail.

[SOx Purging Lean Control]

The SOx purging lean control module 60A executes a SOx purging lean control in which the air exceeding ratio of exhaust gas is lowered from an air exceeding ratio for a steady-state driving (for example, about 1.5) to a first target air exceeding ratio (for example, about 1.3) which is leaner than a value (about 1.0) corresponding to a stoichiometric air-fuel ratio. Hereinafter, the SOx purging lean control will be described in detail.

Figure 4:
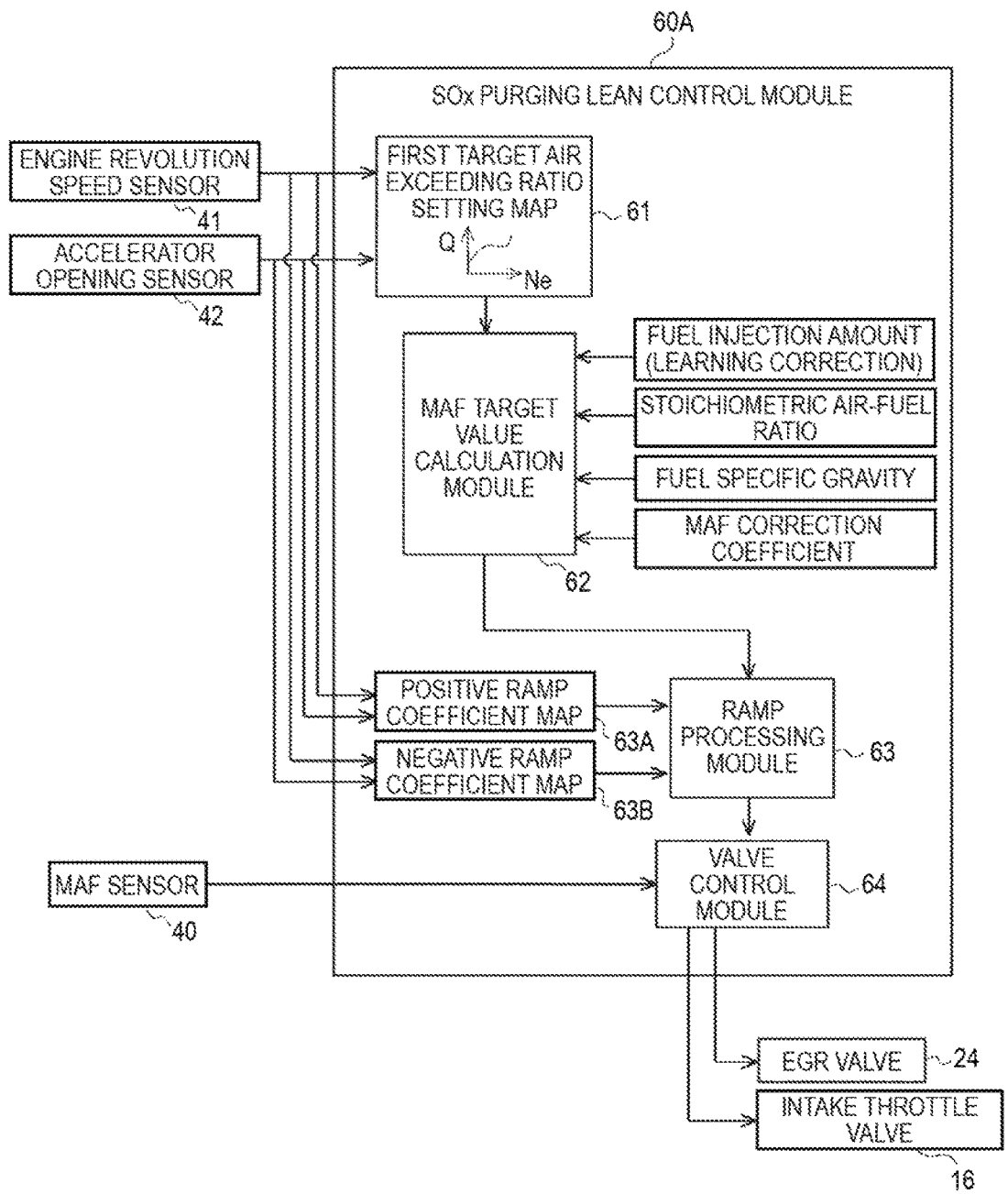
FIG. 4 is a block diagram illustrating a MAF target value setting process in executing a SOx purging lean control according to the embodiment of the present invention.

FIG. 4 is a block diagram illustrating a MAF target value $MAF_{SPL\_Trgt}$ setting process in executing the SOx purging lean control. A first target air exceeding ratio setting map 61 is a map that is referred to based on an engine revolution speed Ne and an accelerator openings Q (an amount of injection of fuel in the engine 10), and air exceeding ratio target values $\lambda_{SPL\_Trgt}$ (first target air exceeding ratios) corresponding to engine revolution speeds Ne and accelerator openings Q for the SOx purging lean control are set based on experiments in advance in the map 61.

Firstly, an air exceeding ratio target value $\lambda_{SPL\_Trgt}$ for the SOx purging lean control is read from the first target air exceeding ratio setting map 61 based on an engine revolution speed Ne and an accelerator opening Q which are inputted as input signals and is then inputted into a MAF target value calculation module 62. Further, in the MAF target value calculation module 62, a MAF target value $MAF_{SPL\_Trgt}$ for the SOx purging lean control is calculated based on the following expression (1).

$$MAF_{SPL\_Trgt} = \lambda_{SPL\_Trgt} \times Q_{fnl\_corrd} \times Ro_{Fuel} \times AFR_{sto} / Maf_{\_corr} \quad (1)$$

In the expression (1), $Q_{fnl\_corrd}$ denotes a fuel injection amount (excluding an amount of fuel injected through post injection) on which a learning correction, which will be described later, has been performed, $Ro_{Fuel}$ denotes a fuel specific gravity, $AFR_{sto}$ denotes the stoichiometric air-fuel ratio, and $Maf_{\_corr}$ denotes a MAF correction coefficient, which will be described later.

The MAF target value $MAF_{SPL\_Trgt}$ that is calculated by the MAF target value calculation module 62 is inputted into a ramp processing module 63 when the SOx purging flag $F_{SP}$ is on. The ramp processing module 63 reads a ramp coefficient from a positive ramp coefficient map 63A and a negative ramp coefficient map 63B based on an engine revolution speed Ne and an accelerator opening Q which are inputted as input signals and inputs a MAF target ramp value $MAF_{SPL\_Trgt\_Ramp}$ to which the read ramp coefficients are added into a valve control module 64.

The valve control module 64 executes a feedback control in which the intake throttle valve 16 is controlled to be closed while the EGR valve 24 is controlled to be opened so that an actual MAF value $MAF_{Act}$ inputted from the MAF sensor 40 becomes the MAF target ramp value $MAF_{SPL\_Trgt\_Ramp}$.

In this way, in this embodiment, the MAF target value $MAF_{SPL\_Trgt}$ is set based on the air exceeding ratio target value $\lambda_{SPL\_Trgt}$ that is read from the first target air exceeding ratio setting map 61 and the fuel injection amounts of the individual injectors 11, and the operation of the air intake system is feedback controlled based on the MAF target value $MAF_{SPL\_Trgt}$. By doing so, the air exceeding ratio of the exhaust gas can be reduced effectively to a desired air exceeding ratio that is necessary for the SOx purging lean control without providing a lambda sensor upstream of the NOx storage reduction catalyst 32 or without using a sensor value of the lambda sensor even when the lambda sensor is provided upstream of the NOx storage reduction catalyst 32.

Additionally, the MAF target value $MAF_{SPL\_Trgt}$ can be set through a feedforward control by using the fuel injection amount $Q_{fnl\_corrd}$ on which a learning correction has been performed as the fuel injection amounts of the individual injectors 11, thereby making it possible to eliminate effectively the influence resulting from the deterioration with age or property variation of the individual injectors 11 or the individual difference thereof.

In addition, the deterioration in drivability that would be caused by a misfire or torque variation of the engine 10 resulting from a dramatic change in the amount of intake air can be prevented effectively by adding a ramp factor that is set according to the running state of the engine 10 to the MAF target value $MAF_{SPL\_Trgt}$.

[SOx Purging Rich Control]

The SOx purging rich control module 60B executes a SOx purging rich control in which the air exceeding ratio of exhaust gas is lowered from the first target air exceeding ratio to a second target air exceeding ratio (for example, about 0.9) which is richer than the first target air exceeding ratio. Hereinafter, the details of the SOx purging rich control will be described.

Figure 5:
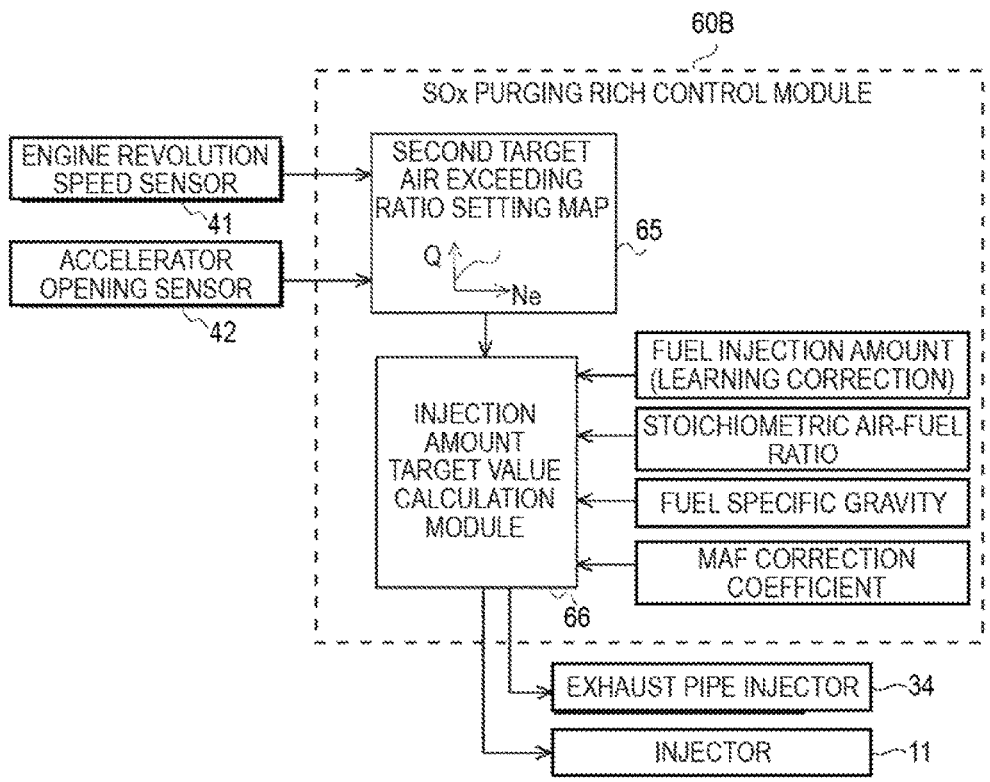
FIG. 5 is a block diagram illustrating a target injection amount setting process in executing a SOx purging rich control according to the embodiment of the present invention.

FIG. 5 is a block diagram showing a setting process of a target injection amount $Q_{SPR\_Trgt}$ (an injection amount per unit time) for an exhaust pipe injection or a post injection in the SOx purging rich control. A second target air exceeding ratio setting map 65 is a map that is referred to based on an engine revolution speed Ne and an accelerator opening Q, and air exceeding ratio target values $\lambda_{SPR\_Trgt}$ (second target air exceeding ratios) corresponding to engine revolution speeds Ne and accelerator openings Q for a SOx purging rich control are set based on experiments in advance in the map.

Firstly, an exceeding air ratio target value $\lambda_{SPR\_Trgt}$ for the SOx purging rich control is read from the second target air exceeding ratio setting map 65 based on an engine revolution speed Ne and an accelerator opening Q which are inputted as input signals and is then inputted into an injection amount target value calculation module 66. Further, in the injection amount target value calculation module 66, a target injection amount $Q_{SPR\_Trgt}$ for the SOx purging rich control is calculated based on the following expression (2).

$$Q_{SPR\_Trgt} = MAF_{SPL\_Trgt} \times Maf_{\_corr}/(\lambda_{SPR\_Trgt} \times Ro_{Fuel} \times AFR_{sto}) - Q_{fnl\_corrd} \quad (2)$$

In the expression (2), $MAF_{SPL\_Trgt}$ denotes a MAF target value for the SOx purging lean control, which is inputted from the MAF target value calculation module 62. In addition, $Q_{fnl\_corrd}$ denotes a fuel injection amount (excluding an amount of fuel injected through post injection) on which a learning correction, which will be described later, has been performed and to which a MAF tracking control has not yet been applied, $Ro_{Fuel}$ denotes a fuel specific gravity, $AFR_{sto}$ denotes a stoichiometric air-fuel ratio, and $Maf_{\_corr}$ denotes a MAF correction coefficient, which will be described later.

The target injection amount $Q_{SPR\_Trgt}$ calculated by the injection amount target value calculation module 66 is transmitted to the exhaust pipe injector 34 or the individual injectors 11 as an injection instruction signal when a SOx purging rich flag $F_{SPR}$, which will be described later, is on.

In this way, in this embodiment, the target injection amount $Q_{SPR\_Trgt}$ is set based on the air exceeding ratio target value $\lambda_{SPR\_Trgt}$ that is read from the second target air exceeding ratio setting map 65 and the fuel injection amounts of the individual injectors 11. By doing so, the air exceeding ratio of the exhaust gas can be reduced effectively to a desired air exceeding ratio that is necessary for the SOx purging rich control without providing a lambda sensor upstream of the NOx storage reduction catalyst 32 or without using a sensor value of the lambda sensor even when the lambda sensor is provided upstream of the NOx storage reduction catalyst 32.

Additionally, the target injection amount $Q_{SPR\_Trgt}$ can be set through a feedforward control by using the fuel injection amount $Q_{fnl\_corrd}$ on which a learning correction has been performed as the fuel injection amount of the individual injectors 11, thereby making it possible to eliminate effectively the influence resulting from the deterioration with age or property variation of the individual injectors 11.

[Catalyst Temperature Adjusting Control for SOx Purging Control]

The temperature of exhaust gas that flows into the NOx storage reduction catalyst 32 (hereinafter, referred also to as a catalyst temperature) during the SOx purging control is controlled by switching the SOx purging rich flag $F_{SPR}$ that executes the exhaust pipe injection or the post injection between on and off (rich and lean) alternately, as shown at times $t_2$ to $t_4$ in FIG. 2. When the SOx purging rich flag $F_{SPR}$ is set on ($F_{SPR}=1$), the catalyst temperature is raised by the exhaust pipe injection or the post injection (hereinafter, this period will be referred to as an injection period $T_{F\_INJ}$). On the other hand, when the SOx purging rich flag $F_{SPR}$ is set off, the exhaust pipe injection or the post injection is stopped, whereby the catalyst temperature is lowered (hereinafter, this period will be referred to as an interval $T_{F\_INT}$).

In this embodiment, the injection period $T_{F\_INJ}$ is set by reading a value corresponding to an engine revolution speed Ne and an accelerator opening Q from an injection period setting map (not shown) that is prepared in advance through experiments. Injection periods obtained in advance through experiments that are necessary to lower the air exceeding ratio of exhaust gas to the second target air exceeding ratio are set so as to correspond to operating states of the engine 10 in the injection period setting map.

The interval $T_{F\_INT}$ is set through a feedback control when the SOx purging rich flag $F_{SPR}$ is switched from on to off where the catalyst temperature becomes the highest. Specifically, the interval $T_{F\_INT}$ is set through a PID control that is made up of a proportional control in which an input signal is changed in proportion to a deviation $\Delta T$ between a target catalyst temperature and an estimated catalyst temperature when the SOx purging rich flag $F_{SPR}$ is off, an integral control in which an input signal is changed in proportion to a time integral value of the deviation $\Delta T$ and a differential control in which an input signal is changed in proportion to a time differential value of the deviation $\Delta T$. The target catalyst temperature may be set at a temperature which enables SOx to be desorbed from the NOx storage reduction catalyst 32, and the estimated catalyst temperature may be estimated based on, for example, an entrance temperature of the oxidation catalyst 31 which is detected by the first exhaust gas temperature sensor 43, an HC and CO calorific values in interiors of the oxidation catalyst 31 and the NOx storage-reduction catalyst 32 or an amount of dissipation of heat to the outside air.

Figure 6:
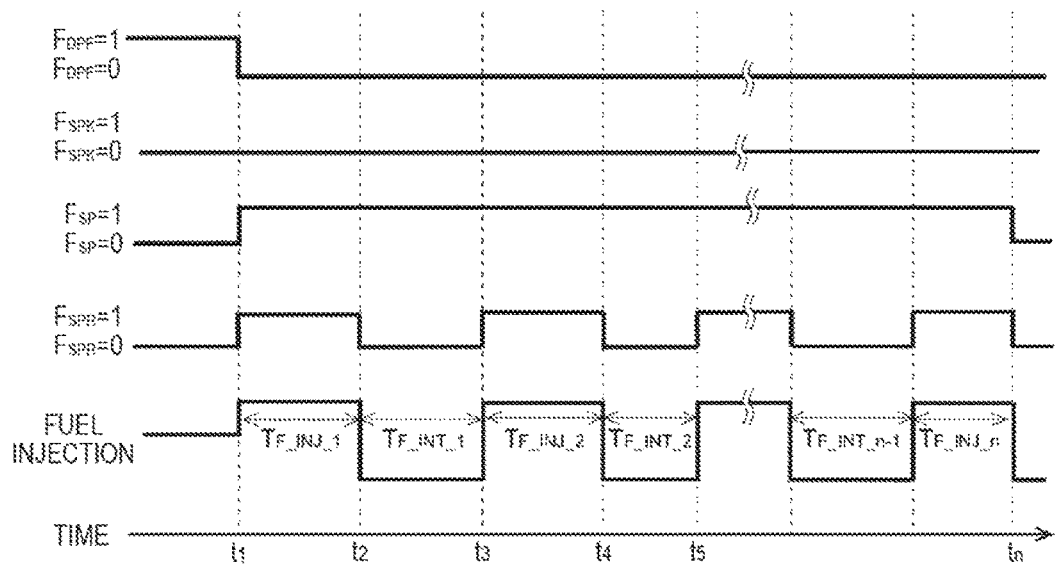
FIG. 6 is a timing chart illustrating a catalyst temperature adjusting control in the SOx purging control according to the embodiment of the present invention.

As shown at a time $t_1$ in FIG. 6, when the SOx purge flag $F_{SP}$ is set on as a result of the filter regeneration flag $F_{DPF}$ and the temperature retention mode flag $F_{SPK}$ being set off, the SOx purging rich flag $F_{SPR}$ is also set on, and further, a feedback calculation is reset temporarily. Namely, in an initial time occurring immediately after the forced filter regeneration, the exhaust pipe injection or the post injection is executed according to the injection period $T_{F\_INJ\_1}$ which is set in the injection period setting map (refer to a time period from a time $t_1$ to a time $t_2$ in FIG. 6). By doing so, the SOx purging control is effected quickly without allowing the exhaust gas temperature which is raised in the forced filter regeneration to be lowered, thereby making it possible to reduce the fuel consumption amount.

Next, once the SOx purging rich flag $F_{SPR}$ is off as the injection period $T_{F\_INJ\_1}$ has elapsed, the SOx purging rich flag $F_{SPR}$ is kept off until the interval $T_{F\_INT\_1}$ that is set through the PID control elapses (refer to a time period from the time $t_2$ to a time $t_3$ in FIG. 6). Further, when the SOx purging rich flag $F_{SPR}$ is on after the interval $T_{F\_INT\_1}$ has elapsed, an exhaust pipe injection or a post injection corresponding to an injection period $T_{F\_INJ\_2}$ is executed again (refer to a time period from the time $t_3$ to a time $t_4$ in FIG. 6). Thereafter, the switching of the SOx purging rich flag $F_{SPR}$ between on and off is executed repeatedly until the SOx purging flag $F_{SP}$ is off as a result of a determination being made that the SOx purging control ends, which will be described later (refer to a time $t_n$ in FIG. 6).

In this way, in this embodiment, the injection period $T_{F\_INJ}$ during which the catalyst temperature is raised and the air exceeding ratio is lowered to the second target air exceeding ratio is set from the map that is referred to based on the operating state of the engine 10, and the interval $T_{F\_INT}$ during which the catalyst temperature is lowered is processed through the PID control. By doing so, the air exceeding ratio can be lowered to the target air exceeding ratio in an ensured fashion while holding effectively the catalyst temperature during the SOx purging control within the desired temperature range that is necessary for purging.

[Determination on Prohibition of SOx Purging Control]

When SOx purging is executed in a state where the engine revolution speed Ne is very high or the fuel injection amount of the injectors 11 is very much, there is a possibility that a drastic increase in engine temperature is called for. In addition, when unburned fuel is supplied in such a state that the temperature of the NOx storage reduction catalyst 32 is reduced, there is also a problem that the generation of white smoke is called for as a result of an increase in HC slip.

To prevent the occurrence of these phenomena, the SOx purging prohibition processing module 70 is designed to prohibit the execution of the SOx purging control by determining that the NOx storage reduction catalyst 32 goes "out of a SOx purging enabling area" when any one of the following prohibition conditions are met: (1) the engine revolution speed Ne exceeds, for example, a predetermined revolution speed upper limit threshold which indicates abnormal revolutions; (2) the fuel injection amount of the injectors 11 exceeds, for example, a predetermined injection amount upper threshold which indicates abnormal injection; and (3) the catalyst temperature of the NOx storage reduction catalyst 32 is reduced to a predetermined threshold temperature (for example, about 500 degrees centigrade) which is lower than a target temperature (a PM combustion temperature) for the filter regeneration control. To be more specific, in a case where any one of the prohibition conditions (1) to (3) is met at the start of or during the SOx purging control and the SOx purging prohibition processing module 70 determines that the NOx storage reduction catalyst 32 is "out of the SOx purging enabling area," a temperature retention mode control, which will be described later, is executed. On the other hand, in a case where none of the prohibition conditions (1) to (3) is met, determining that the NOx storage reduction catalyst 32 is "within the SOx purging enabling area," the SOx purging prohibition processing module 70 is designed to permit the execution of the SOx purging control.

The prohibition conditions are not limited to those three conditions, and hence, it is possible to add other prohibition conditions including a system failure which are not suitable for execution of the SOx purging.

[Temperature Retention Mode Control]

The temperature retention mode control module 71 is a temperature retention control means disclosed in the present invention and sets a temperature retention mode flag $F_{SPK}$ on to start a temperature retention mode control when the filter regeneration control ends (when the SOx purging control starts) or any one of the prohibition conditions (1) to (3) described above is met while the SOx purging control is being executed. The temperature retention mode control is executed by feedback controlling the exhaust pipe injection amount or the post injection amount based on a predetermined temperature retention target temperature (a second target temperature) which is lower than the SOx desorption temperature. In this embodiment, the temperature retention target temperature is set, for example, at the target temperature (the PM combustion temperature) for the filter regeneration control.

Hereinafter, referring to FIG. 7, a switching operation among the filter regeneration control, the temperature retention mode control and the SOx purging control will be described in detail.

In a case where when the filter regeneration control ends ($F_{DPF}=0$), any one of the prohibition conditions (1) to (3) is met and it is determined that the NOx storage reduction catalyst 32 is "out of the SOx purging enabling area," as shown in a pattern A in FIG. 7, the NOx storage reduction catalyst 32 is shifted to the temperature retention control ($F_{SPK}=1$) without starting the SOx purging control.

On the other hand, in a case where when the filter regeneration control ends ($F_{DPF}=0$), none of the prohibition conditions (1) to (3) is met and it is determined that the NOx storage reduction catalyst 32 is "within the SOx purging enabling area," as shown in a pattern B in FIG. 7, the SOx purging control ($F_{SP}=1$) is started without being shifted to the temperature retention control.

While it is determined that the NOx storage reduction catalyst 32 is "within the SOx purging enabling area" with none of the prohibition conditions (1) to (3) being met during the execution of the SOx purging control ($F_{SP}=1$), as shown in a pattern C in FIG. 7, the catalyst temperature adjusting control (refer to FIG. 6) is executed in which the SOx purging rich flag $F_{SPR}$ is switched between on and off (rich and lean).

On the other hand, in a case where any one of the prohibition conditions (1) to (3) is met and it is determined that the NOx storage reduction catalyst 32 is "out of the SOx purging enabling area" during the execution of the SOx purging control, as shown in a pattern D in FIG. 7, the NOx storage reduction catalyst 32 is shifted to the temperature retention control ($F_{SPK}=1$) with a view to interrupting the SOx purging control.

In this way, in this embodiment, when it is determined that the NOx storage reduction catalyst 32 is "out of the SOx purging enabling area" at the start of or during the execution of the SOx purging control, with the SOx purging control prohibited, the temperature retention mode control is executed. By doing so, a wasteful execution of the SOx purging control is prevented in an ensured fashion, whereby it is possible to prevent effectively the deterioration of fuel consumption, a drastic increase in engine temperature and the generation of white smoke. Since the catalyst temperature is held at the PM combustion temperature by the temperature retention mode control while the SOx purging control is being prohibited (interrupted), it is possible to reduce effectively the fuel consumption amount in resuming the SOx purging control thereafter.

[Determination on End of SOx Purging Control and Temperature Retention Control]

The SOx purging and temperature retention mode ending processing module 72 is an ending processing means disclosed in the present invention executes an ending process of ending the temperature retention mode control or the SOx purging control based on a SOx occlusion amount of the NOx storage reduction catalyst 32 and an accumulated execution time of the temperature retention mode control or the SOx purging control. Hereinafter, referring to FIG. 8, individual ending processing patterns will be described in detail. In the disclosure of the present invention, an ending process of ending the temperature retention mode control or the SOx purging control is defined as a process of ending the temperature retention mode control or the SOx purging control to resume the normal lean-burn operation.

[Ending Pattern A]

A pattern A shown in FIG. 8 is an example of an ending pattern where the NOx storage reduction catalyst 32 is restored from the SOx poisoning to thereby end the SOx purging control. In a case where a SOx occlusion amount SA of the NOx storage reduction catalyst 32 is lowered to a predetermined first occlusion threshold $SA_1$ indicating that the NOx storage reduction catalyst 32 is restored from SOx poisoning as a result of the execution of the SOx purging control, the SOx purging rich flag $F_{SPR}$ is set off ($F_{SPR}=0$), and the SOx purging control is ended without being shifted to the temperature retention mode control, whereby the lean-burn operation is resumed. The SOx occlusion amount SA of the NOx storage reduction catalyst 32 should be estimated based on a model expression or a map which includes, for example, an operating state of the engine 10 or a sensor value of the NOx/lambda sensor 45 as an input signal. The first occlusion threshold $SA_1$ is obtained in advance through experiments and is stored in the memory of the ECU 50.

[Ending Pattern B]

A pattern B shown in FIG. 8 is an example of an ending pattern where the SOx purging control is caused to end based on a limited time irrespective of whether the NOx storage reduction catalyst 32 is restored from SOx poisoning. In a case where an accumulated execution time $T_{SPR\_sum}$ which is counted by a timer from the start of the SOx purging control reaches a predetermined first upper limit threshold time $T_{SPR\_Lim1}$, the SOx purging rich flag $F_{SPR}$ is set off ($F_{SP}$, $F_{SPR}=0$), without executing the temperature retention mode control, to end the SOx purging control. The first upper limit threshold time $T_{SPR\_Lim1}$ is obtained in advance through experiments and stored in the memory of the ECU 50.

[Ending Pattern C]

A pattern C shown in FIG. 8 is an example of an ending pattern where the temperature retention mode control is stopped in an upper limit time when the temperature retention mode control is caused to continue as a result of a determination being made that the NOx storage reduction catalyst 32 is "out of the SOx purging enabling area." In a case where an accumulated execution time $T_{SPK\_sum}$ which is counted by a timer from the start of the temperature retention mode control reaches a predetermined second upper limit threshold time $T_{SPK\_Lim2}$, the temperature retention mode flag $F_{SPK}$ is set off ($F_{SPK}=0$) to stop the temperature retention mode control without shifting to the SOx purging control. The second upper limit threshold time $T_{SPK\_Lim2}$ is a period of time which is shorter than the first upper limit threshold time $T_{SPR\_Lim1}$ and is obtained in advance through experiments to be stored in the memory of the ECU 50 ($T_{SPK\_Lim2}<T_{SPR\_Lim1}$).

[Ending Pattern D]

A pattern D shown in FIG. 8 is an example of an ending pattern where the temperature retention mode control is stopped in the upper limit time when the temperature retention mode control is caused to continue as a result of a determination being made that the NOx storage reduction catalyst 32 is "out of the SOx purging enabling area," although the SOx occlusion amount has been reduced only to a predetermined amount. In a case where although the SOx occlusion amount SA is reduced below a predetermined second occlusion amount threshold $SA_2$, the accumulated execution time $T_{SPK\_sum}$ which is counted by a timer from the start of the temperature retention mode control reaches a predetermined third upper limit threshold time $T_{SPK\_Lim3}$, the temperature retention mode flag $F_{SPK}$ is set off ($F_{SPK}=0$) to stop the temperature retention mode control without shifting to the SOx purging control. The second occlusion amount threshold $SA_2$ is a value which is greater than the first occlusion amount threshold $SA_1$ and is obtained in advance through experiments to be stored in the memory of the ECU 50 ($SA_2>SA_1$). The third upper limit threshold time $T_{SPK\_Lim3}$ is a period of time which is shorter than the second upper limit threshold time $T_{SPK\_Lim2}$ and is obtained in advance through experiments to be stored in the memory of the ECU 50 ($T_{SPK\_Lim3}<T_{SPK\_Lim2}<T_{SPR\_Lim1}$).

[Ending Pattern E]

A pattern E shown in FIG. 8 is an example of an ending pattern where a total sum of accumulated times of the SOx purging lean control and the SOx purging rich control (an accumulated time of the SOx purging control) reaches an upper limit time to stop the SOx purging control. In a case where an accumulated execution time of the SOx purging control $T_{SP\_sum}$ reaches a predetermined fourth upper threshold time $T_{\_Lim4}$, the SOx purge flag $F_{SP}$ is set off ($F_{SP}=0$) to end the SOx purging control. The fourth upper limit threshold time $T_{\_Lim4}$ is obtained in advance through experiments and stored in the memory of the ECU 50.

[Ending Pattern F]

A pattern F shown in FIG. 8 shows an example of an ending pattern where an execution time of the temperature retention mode control reaches an upper limit time to thereby end the temperature retention mode control. In a case where an accumulated execution time of the temperature retention mode control $T_{SPK\_sum}$ reaches a predetermined fifth upper threshold time $T_{\_Lim5}$, the temperature retention mode flag $F_{SPK}$ is set off ($F_{SP}=0$, $F_{SPK}=0$) to end the temperature retention mode control. The fifth upper limit threshold time $T_{\_Lim5}$ is obtained in advance through experiments and stored in the memory of the ECU 50.

In this way, in this embodiment, the upper limits are provided for the accumulated execution times of the SOx purging control and the temperature retention mode control as the ending conditions thereof, whereby it is possible to prevent effectively an increase in fuel consumption amount, an excessive increase in temperature of exhaust gas, abnormal PM combustion, the thermal deterioration of the catalysts that would otherwise be caused by the continuous execution of those controls.

[MAF Tracking Control]

A MAF tracking control module 80 executes a control (hereinafter, referred to as a MAF tracking control) to correct a fuel injection timing and a fuel injection amount of the individual injectors 11 according to a change in MAF during the following periods of time: (1) a period of time from the end of the filter regeneration control to the start of the SOx purging control when the lean state is switched to the rich state; and (2) a period of time when the rich state is switched to the lean state due to the end of the SOx purging control.

When a large amount of EGR gas is introduced into the combustion chamber of the engine 10 by the action of the air intake system during the SOx purging lean control, in the event that fuel is injected at the same timing as that for the lean state of the normal operation, there is caused a delay in ignition. Due to this, when the lean state is switched to the rich state, it is necessary that the injection timing angle is advanced by something like a predetermined amount. On the other hand, when the rich state is switched to the lean state, it is necessary that the injection timing angle is shifted back to the normal one by delaying. However, advancing or delaying the injection timing angle is executed more quickly than the action of the air intake system. This completes the advancing or delaying the injection timing angle before the air exceeding ratio reaches the target air exceeding ration by the action of the air intake system, causing a problem that the deterioration in drivability is called for by a drastic increase in NOx generation amount, combustion noise and/or torque.

Figure 9:
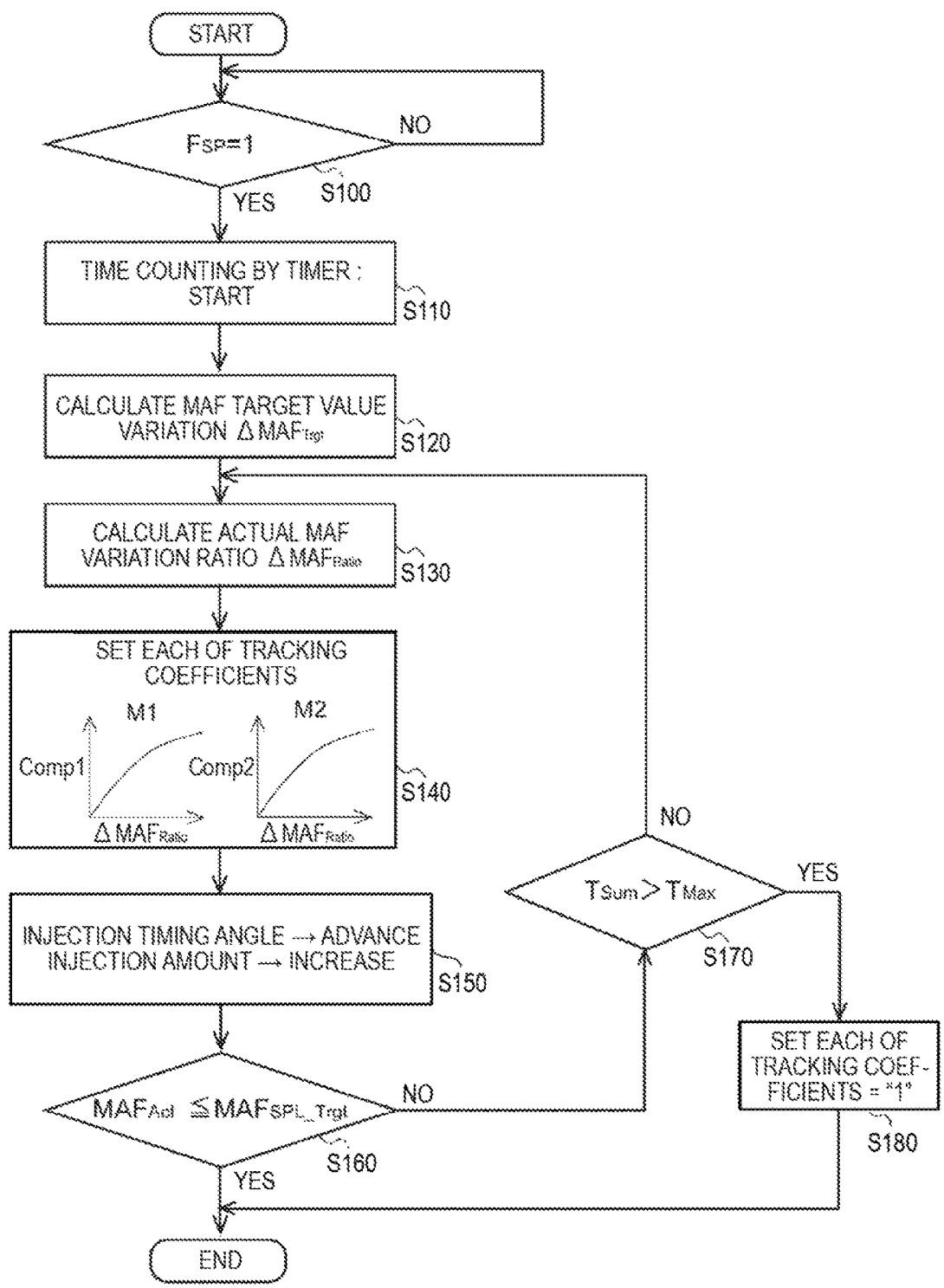
FIG. 9 is a flow chart illustrating a switch from a lean state to a rich state in a MAF tracking control according to the embodiment of the present invention.
Figure 10:
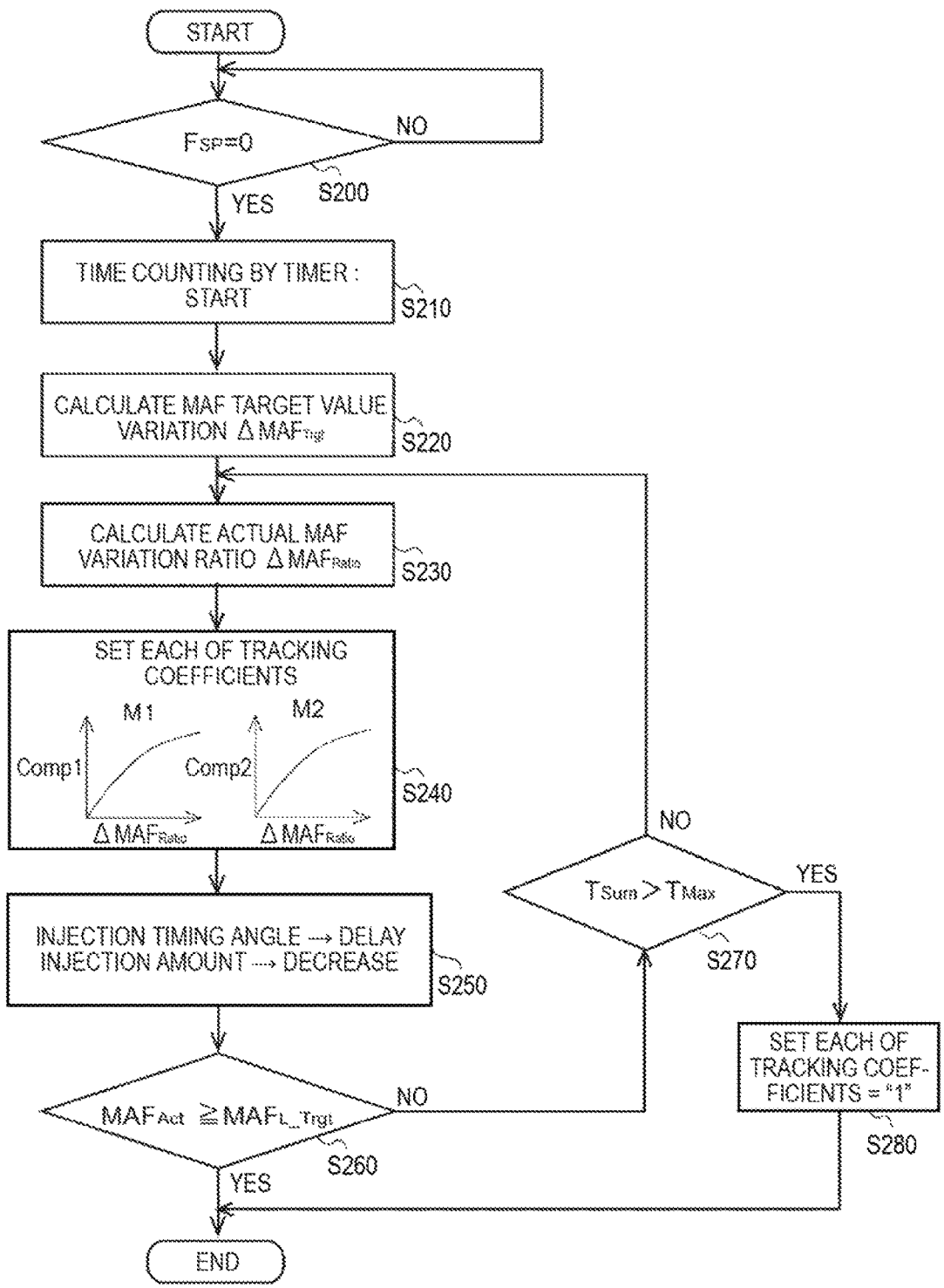
FIG. 10 is a flow chart illustrating a switch from the rich state to the lean state in the MAF tracking control according to the embodiment of the present invention.

With a view to avoiding the phenomenon described above, the MAF tracking control is executed as shown in flow charts in FIGS. 9, 10 in which the injection timing angle is corrected to be advanced or delayed or the fuel injection amount is corrected to be increased or decreased according to a change in MAF Firstly, referring to FIG. 9, a MAF tracking control for the switching period when the lean state is switched to the rich state will be described.

When the SOx purging flag $F_{SP}$ is set on in step S100, the timer starts counting an elapsing time since the MAF tracking control is started in step S110.

In step S120, a MAF target value $MAF_{L\_Trgt}$ before the switching (the lean state) is subtracted from a MAF target value $MAF_{SPL\_Trgt}$ after the switching (the rich state) to thereby calculate a MAF target value variation $\Delta MAF_{Trgt}$ ($=MAF_{SPL\_Trgt}-MAF_{L\_Trgt}$) before and after the switching.

In step S130, a current actual MAF variation ratio $\Delta MAF_{Ratio}$ is calculated. To be more specific, the MAF target value $MAF_{L\_Trgt}$ before the switching is subtracted from a current actual MAF value $MAF_{Act}$ that is detected by the MAF sensor 40 to thereby calculate an actual MAF variation $\Delta MAF_{Act}$ ($=MAF_{Act}-MAF_{L\_Trgt}$) since the start of the MAF tracking control to the current time. Then, the resulting actual MAF variation $\Delta MAF_{Act}$ is divided by the MAF target value variation $\Delta MAF_{Trgt}$ before and after the switching to thereby calculate an actual MAF variation ratio $\Delta MAF_{Ratio}$ ($=\Delta MAF_{Act}/\Delta MAF_{Trgt}$).

In step S140, a coefficient by which the injection timing angle of the individual injectors 11 is advanced or delayed (hereinafter, referred to as an injection timing tracking coefficient $Comp_1$) and a coefficient by which the injection amount of the individual injectors 11 is increased or decreased (hereinafter, referred to as an injection amount tracking coefficient $Comp_2$) are set. To be more specific, an injection timing tracking coefficient setting map M1 which is prepared in advance through experiments to specify a relationship between the actual MAF variation ratio $MAF_{Ratio}$ and the injection timing tracking coefficient $Comp_1$ and an injection amount tracking coefficient setting map M2 which is also prepared in advance through experiments to specify a relationship between the actual MAF variation ratio $MAF_{Ratio}$ and the injection amount tracking coefficient $Comp_2$ are stored in the memory, not shown, of the ECU 50. The injection timing tracking coefficient $Comp_1$ and the injection amount tracking coefficient $Comp_2$ are set by reading values corresponding to the actual MAF variation ratio $\Delta MAF_{Ratio}$ which is calculated in step S130 from the maps M1, M2.

In step S150, the injection timing angle of the individual injectors 11 is advanced by an amount resulting from multiplying a target advancing amount by the injection timing tracking coefficient $Comp_1$, and the fuel injection amount of the individual injectors 11 is also increased by an amount resulting from multiplying a target injection increasing amount by the injection amount tracking coefficient $Comp_2$.

Thereafter, in step S160, it is determined whether or not the current actual MAF value $MAF_{Act}$ that is detected by the MAF sensor 40 reaches the MAF target value $MAF_{SPL\_Trgt}$ after switching (the rich state). If the current actual MAF value $MAF_{Act}$ has not yet reached the MAF target value $MAF_{SPL\_Trgt}$ (No), the flow returns to step S130 by way of step S170. Namely, the operations from step S130 to step S150 are repeated until the actual MAF value $MAF_{Act}$ reaches the MAF target value $MAF_{SPL\_Trgt}$ to thereby continue advancing the injection timing angle and increasing the injection amount so as to meet the actual MAF variation ratio $MAF_{Ratio}$ which varies every moment. An operation in step S170 will be described in detail. On the other hand, if it is determined in step S160 that the actual MAF value $MAF_{Ref}$ reaches the MAF target value $MAF_{SPL\_Trgt}$ (Yes), this control ends.

In step S170, it is determined whether or not an accumulated time $T_{Sum}$ counted since the start of the MAF tracking control by the timer exceeds a predetermined upper limit time $T_{Max}$.

In shifting from the lean state to the rich state, there is a case where an actual MAF value $MAF_{Ref}$ cannot track properly a MAF target value $MAF_{L\-R\_Trgt}$ for the shifting period due to a delay in controlling the valve, whereby the actual MAF value $MAF_{Ref}$ is kept lower than the MAF target value $MAF_{L\-R\_Trgt}$ (refer to the time $t_1$ to the time $t_2$). In the event that the MAF tracking control is caused to continue in this state, the actual fuel injection amount is not increased to the target injection amount, and the combustion in the engine 10 becomes unstable, resulting in a possibility that a torque variation or the deterioration in drivability is called for.

In this embodiment, with a view to avoiding the occurrence of this phenomenon, if it is determined in step S170 that the accumulated time $T_{Sum}$ exceeds the upper limit time $T_{Max}$ (Yes), that is, if the actual MAF value $MAF_{Ref}$ does not keep changing by a predetermined value or more for a predetermined period of time, the flow proceeds to step S180, where the injection timing tracking coefficient $Comp_1$ and the injection amount tracking coefficient $Comp_2$ are forced to be set at "1". By doing so, the MAF tracking control is forced to end then, thereby making it possible to prevent effectively the occurrence of a torque variation or the deterioration of drivability.

Next, referring to FIG. 10, a MAF tracking control for the switching period when the rich state is switched to the lean state will be described.

When the SOx purging flag $F_{SP}$ is set off in step S200, the timer starts counting an elapsing time since the MAF tracking control is started in step S210.

In step S220, a MAF target value $MAF_{SPL\_Trgt}$ before the switching (the rich state) is subtracted from a MAF target value $MAF_{L\_Trgt}$ after the switching (the lean state) to thereby calculate a MAF target value variation $\Delta MAF_{Trgt}$ (=$MAF_{L\_Trg}-MAF_{SPL\_Trgt}$) before and after the switching.

In step S230, a current actual MAF variation ratio $\Delta MAF_{Ratio}$ is calculated. To be more specific, the MAF target value $MAF_{SPL\_Trgt}$ before the switching is subtracted from a current actual MAF value $MAF_{Act}$ that is detected by the MAF sensor 40 to thereby calculate an actual MAF variation $\Delta MAF_{Act}$ (=$MAF_{Act}-MAF_{SPL\_Trt}$) since the start of the MAF tracking control to the current time. Then, the resulting actual MAF variation $\Delta MAF_{Act}$ is divided by the MAF target value variation $\Delta MAF_{Trgt}$ before and after the switching to thereby calculate an actual MAF variation ratio $\Delta MAF_{Ratio}$ (=$\Delta MAF_{Act}/\Delta MAF_{Trgt}$).

In step S240, a value corresponding to the actual MAF variation ratio $\Delta MAF_{Ratio}$ is read from the injection timing tracking coefficient map M1 as an injection timing tracking coefficient $Comp_1$, and a value corresponding to the actual MAF variation ratio $\Delta MAF_{Ratio}$ is read from the injection amount tracking coefficient map M2 as an injection amount tracking coefficient $Comp_2$.

In step S250, the injection timing angle of the individual injectors 11 is delayed by an amount resulting from multiplying a target delaying amount by the injection timing tracking coefficient $Comp_1$, and the fuel injection amount of the individual injectors 11 is also decreased by an amount resulting from multiplying a target injection decreasing amount by the injection amount tracking coefficient $Comp_2$.

Thereafter, in step S260, it is determined whether or not the current actual MAF value $MAF_{Act}$ that is detected by the MAF sensor 40 reaches the MAF target value $MAF_{L\_Trgt}$ after switching (the lean state). If the current actual MAF value $MAF_{Act}$ has not yet reached the MAF target value $MAF_{L\_Trgt}$ (No), the flow returns to step S230 by way of step S270. Namely, the operations from step S230 to step S250 are repeated until the actual MAF value $MAF_{Act}$ reaches the MAF target value $MAF_{L\_Trgt}$ to thereby continue delaying the injection timing angle and decreasing the injection amount so as to meet the actual MAF variation ratio $MAF_{Ratio}$ which varies every moment. An operation in step S270 will be described in detail. On the other hand, if it is determined in step S260 that the actual MAF value $MAF_{Ref}$ reaches the MAF target value $MAF_{L\_Trgt}$ (Yes), this control ends.

In step S270, it is determined whether or not an accumulated time $T_{Sum}$ counted since the start of the MAF tracking control by the timer exceeds a predetermined upper limit time $T_{Max}$.

In shifting from the rich state to the lean state, there is a case where an actual MAF value $MAF_{Rref}$ cannot track properly a MAF target value $MAF_{L-R\_Trgt}$ for the shifting period due to a delay in controlling the valve, whereby the actual MAF value $MAF_{Ref}$ is kept higher than the MAF target value $MAF_{L-R\_Trgt}$ (refer to the time $t_1$ to the time $t_2$). In the event that the MAF tracking control is caused to continue in this state, the actual fuel injection amount becomes greater than the target injection amount, resulting in a possibility that a torque variation or the deterioration in drivability is called for.

In this embodiment, with a view to avoiding the occurrence of this phenomenon, if it is determined in step S270 that the accumulated time $T_{Sum}$ exceeds the upper limit time $T_{Max}$ (Yes), that is, if the actual MAF value $MAF_{Ref}$ does not keep changing by a predetermined value or more for a predetermined period of time, the flow proceeds to step S280, where the injection timing tracking coefficient $Comp_1$ and the injection amount tracking coefficient $Comp_2$ are forced to be set at "1". By doing so, the MAF tracking control is forced to end then, thereby making it possible to prevent effectively the occurrence of a torque variation or the deterioration of drivability.

[Injection Amount Learning Correction]

Figure 11:
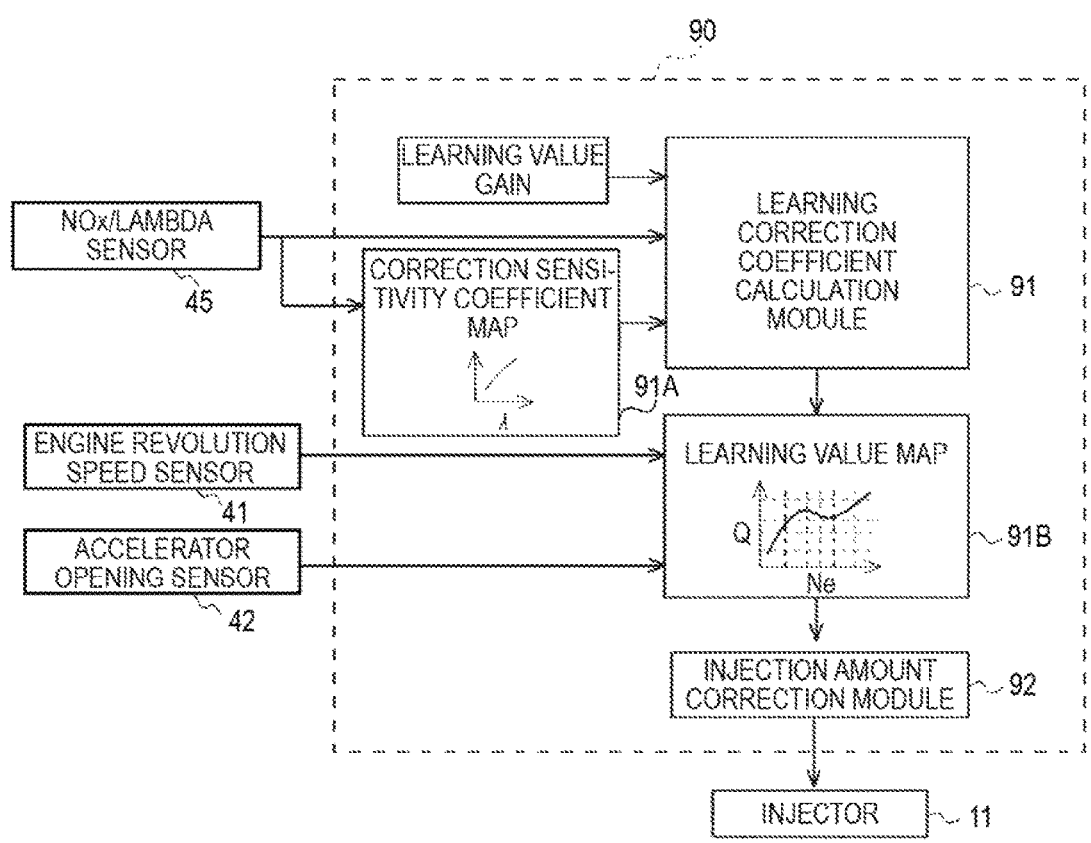
FIG. 11 is a block diagram showing an injector's injection amount learning correction process according to the embodiment of the present invention.

As shown in FIG. 11, the injection amount learning correction unit 90 has a learning correction coefficient calculation module 91 and an injection amount correction module 92.

Figure 12:
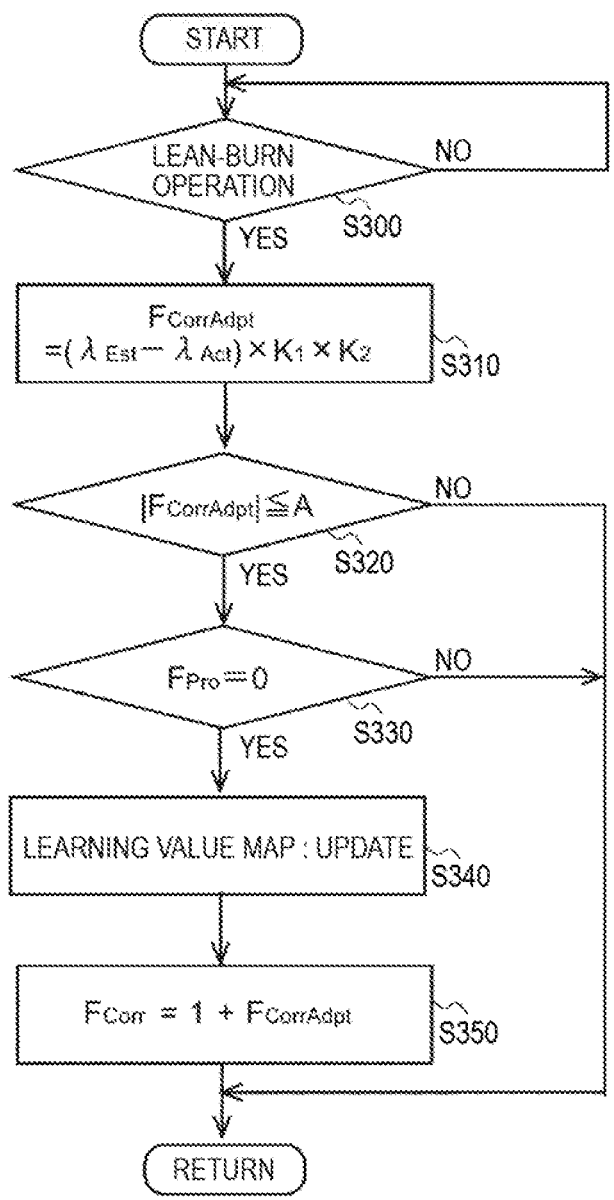
FIG. 12 is a flow chart illustrating a learning correction coefficient calculation process according to the embodiment of the present invention.

The learning correction coefficient calculation module 91 calculates a learning correction coefficient $F_{Corr}$ for a fuel injection amount based on an error $\Delta\lambda$ between an actual lambda value $\lambda_{Act}$ that is detected by the NOx/lambda sensor 45 when the engine 10 operates in a lean-burn state and an estimated lambda value $\lambda_{Est}$. Since the concentration of HC in exhaust gas is very low when the exhaust gas is lean, a change in exhaust gas lambda value due to an oxidation reaction of HC in the oxidation catalyst 31 is so little as to be ignored. Due to this, it is considered that the actual lambda value $\lambda_{Act}$ in exhaust gas that passes through the oxidation catalyst 31 to be detected by the NOx/lambda sensor 45 of the downstream side coincides with the estimated lambda value $\lambda_{Est}$ in exhaust gas discharged from the engine 10. Namely, in a case where an error $\Delta\lambda$ is caused between the actual lambda value $\lambda_{Act}$ and the estimated lambda value $\lambda_{Est}$, it can be assumed that the error $\Delta\lambda$ is caused by a difference between an instructed injection amount given to the individual injectors 11 and an actual injection amount therefrom. Hereinafter, a calculation process of a learning correction coefficient that is executed using the error $\Delta\lambda$ by the learning correction coefficient calculation module 91 will be described based on a flow of the calculation process shown in FIG. 12.

In step S300, it is determined based on an engine revolution speed Ne and an accelerator opening Q whether or not the engine 10 is operating in the lean state. If it is determined that the engine 10 is operating in the lean state, the flow proceeds to step S310 to start a calculation of a learning correction coefficient.

In step S310, an error $\Delta\lambda$ that is obtained by subtracting an actual lambda value $\lambda_{Act}$ detected by the NOx/lambda sensor 45 from an estimated lambda value $\lambda_{Est}$ is multiplied by a learning value gain $K_1$ and a correction sensitivity coefficient $K_2$ to thereby calculate a learning value $F_{CorrAdpt}$ ($F_{CorrAdpt}=(\lambda_{Est}-\lambda_{Act})\times K_1 \times K_2$). The estimated lambda value $\lambda_{Est}$ is estimated and calculated from the operating state of the engine 10 that corresponds to the engine revolution speed Ne and the accelerator opening Q. The correction sensitivity coefficient $K_2$ is read from a correction sensitivity coefficient map 91A shown in FIG. 11 using the actual lambda value $\lambda_{Act}$ detected by the NOx/lambda sensor 45 as an input signal.

In step S320, it is determined whether or not an absolute value $|F_{CorrAdpt}|$ of the learning value $F_{CorrAdpt}$ is within a range of a predetermined correction limit value A. If it is determined that the absolute value $|F_{CorrAdpt}|$ exceeds the correction limit value A, this control is caused to proceed directly to return to end the current learning.

In step S330, it is determined whether or not a learning prohibition flag $F_{Pro}$ is off. As an example of a case where the learning prohibition flag $F_{Pro}$ is set on, a transient operation and a SOx purging control operation ($F_{SP}=1$) of the engine 10 can be raised. The reason that the determination above is made is that in such a state that those conditions are met, the error $\Delta\lambda$ becomes great due to the change in actual lambda value $\lambda_{Act}$ to thereby make it impossible to execute an accurate learning. Whether or not the engine 10 is in a transient operating state should be determined based, for example, on a variation with time of the actual lambda value $\lambda_{Act}$ that is detected by the NOx/lambda sensor 45, and in a case where the variation with time of the actual lambda value $\lambda_{Act}$ is greater than a predetermined threshold, it is determined that the engine 10 is in the transient operating state.

In step S340, a learning value map 91B (refer to FIG. 11) that is referred to based on the engine revolution speed Ne and the acceleration opening Q is updated to the learning value $F_{CorrAdpt}$ that is calculated in step S310. To be more specific, a plurality of learning areas, which are defined according to engine revolution speeds Ne and accelerator openings Q, are set on the learning value map 91B. These learning areas are preferably set so that those tending to be used more frequently are set narrower whereas others tending to be used less frequently are set wider. By setting the learning areas in that way, the learning accuracy is improved in the areas tending to be used more frequently, and the occurrence of no learning can be prevented effectively in the areas tending to be used less frequently.

In step S350, a learning correction coefficient $F_{Corr}$ is calculated by adding "1" to a learning value that is read from the learning value map 91B using the engine revolution speed Ne and the accelerator opening Q which are inputted as input signals ($F_{Corr}=1+F_{CorrApdt}$). This learning correction coefficient $F_{Corr}$ is inputted into the injection amount correction module 92 shown in FIG. 11.

The injection amount correction module 92 executes corrections of fuel injection amounts for a pilot injection $Q_{Pilot}$, a pre-injection $Q_{Pre}$, a main injection $Q_{Main}$, an after-injection $Q_{After}$, and a post injection $Q_{Post}$ by multiplying basic injection amounts for those injections by the learning correction coefficient $F_{Corr}$.

In this way, it is possible to eliminate effectively variations in relation to the deterioration with age or property variation of the injectors 11 or the individual difference thereof by correcting the fuel injection amounts of the injectors 11 with a learning value corresponding to an error $\Delta\lambda$ between an estimated lambda value $\lambda_{Est}$ and an actual lambda value $\lambda_{Act}$.

[MAF Correction Coefficient]

The MAF correction coefficient calculation module 95 calculates a MAF correction coefficient $Maf_{\_corr}$ that is used for setting a MAF target value $MAF_{SPL\_Trgt}$ and a target injection amount $Q_{SPR\_Trgt}$ for a SOx purging control operation.

In this embodiment, the fuel injection amount of the individual injectors 11 is corrected based on an error $\Delta\lambda$ between an actual lambda value $\lambda_{Act}$ detected by the NOx/lambda sensor 45 and an estimated lambda value $\lambda_{Est}$. However, since lambda is a ratio of air to fuel, the cause for the error $\Delta\lambda$ is not always the influence resulting from the difference between the instructed injection amount given to the individual injectors 11 and the actual injection amount therefrom. Namely, it is possible that not only errors of the injectors 11 but also an error of the MAF sensor 40 influences the lambda value error $\Delta\lambda$.

Figure 13:
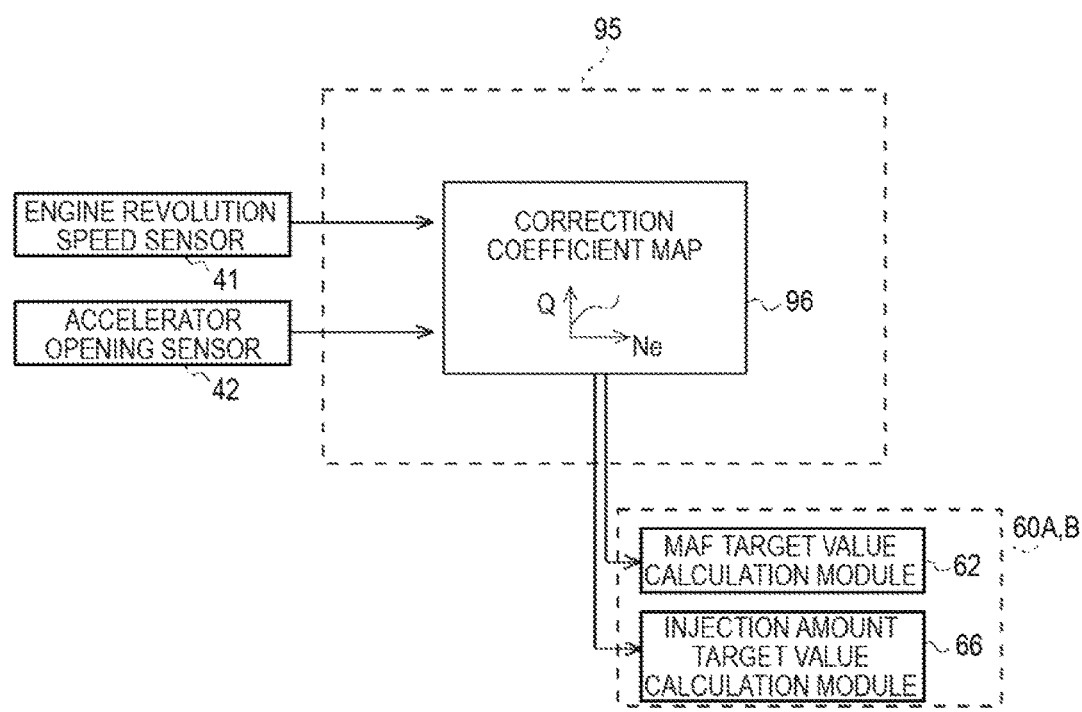
FIG. 13 is a block diagram showing a MAF correction coefficient setting process according to the embodiment of the present invention.

FIG. 13 is a block diagram showing a setting process of a MAF correction coefficient $Maf_{\_corr}$ by the MAF correction coefficient calculation module 95. A correction coefficient setting map 96 is a map that is referred to based on the engine revolution value Ne and the accelerator opening Q, and MAF correction coefficients $Maf_{\_corr}$ indicating sensor properties of the MAF sensor 40 corresponding to engine revolution speeds Ne and accelerator openings Q are set in advance through experiments in the map.

The MAF correction coefficient calculation module 95 reads a MAF correction coefficient $Maf_{\_corr}$ from the correction coefficient setting map 96 using an engine revolution speed Ne and an accelerator opening Q which are inputted as input signals and sends this MAF correction coefficient $Maf_{\_corr}$ to both the MAF target value calculation module 62 and the injection amount target value calculation module 66. By doing so, it is possible to reflect effectively the sensor properties of the MAF sensor 40 to the setting of a MAF target value $MAF_{SPL\_Trgt}$ and a target injection amount $Q_{SPR\_Trgt}$ in operating the SOx purging control.

Other Examples

The present invention is not limited to the embodiment that has been described heretofore and hence can be carried out by being modified as required without departing from the spirit and scope of the present invention.

This patent application is based on Japanese Patent Application (No. 2015-048308) filed on Mar. 11, 2015 and Japanese Patent Application (No. 2015-048309) filed on Mar. 11, 2015, the contents of which are incorporated herein by reference.

INDUSTRIAL APPLICABILITY

The exhaust purification system and the exhaust purification method of the present invention are useful in preventing effectively the thermal deterioration of the catalyst and the deterioration in fuel economy which are induced by a continuous execution of the SOx purging control or the temperature retention mode.

DESCRIPTION OF REFERENCE NUMERALS

10 Engine
11 Injector
12 Intake passage
13 Exhaust passage
16 Intake throttle valve
24 EGR valve
31 Oxidation catalyst
32 NOx storage reduction catalyst
33 Filter
34 Exhaust pipe injector
40 MAF sensor
45 NOx/lambda sensor
50 ECU

The invention claimed is:

1. An exhaust purification system comprising:
a NOx reduction catalyst which is provided on an exhaust passage of an internal combustion engine to reduce and purify NOx contained in exhaust gas which flows inside the exhaust passage;
a filter which is provided on the exhaust passage to collect particulate matters in the exhaust gas;
an injection system configured to inject a fuel; and
a controller configured to:
execute a catalyst regeneration control for restoring the NOx reduction catalyst from sulfur poisoning by increasing a temperature of the exhaust gas to a predetermined first target temperature at which sulfur oxides contained in the exhaust gas are desorbed through an injection system control which controls the injection system to increase at least a fuel injection amount of the fuel;

prohibit an execution of the catalyst regeneration control according to an operating state of the internal combustion engine when a catalyst temperature of the NOx reduction catalyst is decreased below a predetermined second target temperature which is lower than the first target temperature by controlling the fuel injection amount during a period of time during which the execution of the catalyst regeneration control is prohibited;

execute a catalyst temperature retention control for maintaining the temperature of the exhaust gas at the second target temperature; and execute a filter regeneration control in which the temperature of the exhaust gas is raised to a combustion temperature of the particulate matters collected on the filter by increasing the fuel injection amount, wherein the second target temperature which is used for the catalyst temperature retention control is set at the combustion temperature of the particulate matters.

2. The exhaust purification system according to claim 1, wherein
the controller is configured to prohibit the execution of the catalyst regeneration control when a revolution speed of the internal combustion engine increases to exceed a predetermined revolution speed upper limit threshold.

3. The exhaust purification system according to claim 1, wherein
the controller is configured to prohibit the execution of the catalyst regeneration control when the fuel injection amount of an injector of the internal combustion engine increases to exceed a predetermined injection amount upper limit threshold.

4. The exhaust purification system according to claim 1, wherein the controller is configured to:
start the catalyst regeneration control when the controller ends the filter regeneration control.

5. The exhaust purification system according to claim 1, wherein
the controller is configured to end the catalyst regeneration control without shifting to the catalyst temperature retention control in a case where a sulfur occlusion amount of the NOx reduction catalyst is lowered to a first occlusion amount threshold by executing the catalyst regeneration control.

6. The exhaust purification system according to claim 5, wherein
the controller is configured to end the catalyst regeneration control without shifting to the catalyst temperature retention control in a case where an accumulated execution time of the injection system control reaches a predetermined first upper limit threshold time while the catalyst regeneration control is being executed.

7. The exhaust purification system according to claim 6, wherein
the controller is configured to end the catalyst temperature retention control in a case where an accumulated execution time of the catalyst temperature retention control reaches a predetermined second upper limit threshold time which is shorter than the first upper limit threshold time.

8. The exhaust purification system according to claim 7, wherein
the controller is configured to end the catalyst temperature retention control in a case where the sulfur occlusion amount of the NOx reduction catalyst is lowered to a predetermined second occlusion amount threshold which is less than the first occlusion amount threshold and the accumulated execution time of the catalyst temperature retention control reaches a predetermined third upper limit threshold time which is shorter than the second upper limit threshold time.

9. The exhaust purification system according to claim 5, wherein
the controller is configured to:
execute the catalyst regeneration control by using in parallel an air intake system control for reducing an intake air flow rate of the internal combustion engine and the injection system control; and
end the catalyst regeneration control without shifting to the catalyst temperature retention control in a case where an accumulated execution time of the air intake system control and the injection system control reaches a predetermined fourth upper limit threshold time.

10. The exhaust purification system according to claim 5, wherein
the controller is configured to end the catalyst temperature retention control in a case where an accumulated execution time of the catalyst temperature retention control reaches a predetermined fifth upper limit threshold time.

11. A control method for an exhaust purification system which includes a NOx reduction catalyst which is provided on an exhaust passage of an internal combustion engine to reduce and purify NOx contained in exhaust gas which flows in the exhaust passage, the method comprising:
executing a catalyst regeneration control for restoring the NOx reduction catalyst from sulfur poisoning by increasing a temperature of the exhaust gas to a predetermined first target temperature at which sulfur oxides contained in the exhaust gas are desorbed through an injection system control which controls an injection system, which is configured to inject a fuel, to increase at least a fuel injection amount of the fuel;

prohibiting an execution of the catalyst regeneration control according to an operating state of the internal combustion engine when a catalyst temperature of the NOx reduction catalyst is decreased below a predetermined second target temperature which is lower than the first target temperature by controlling the fuel injection amount during a period of time during which the execution of the catalyst regeneration control is prohibited;

executing a catalyst temperature retention control for maintaining the temperature of the exhaust gas at the second target temperature; and executing a filter regeneration control in which the temperature of the exhaust gas is raised to a combustion temperature of the particulate matters collected on a filter which is provided on the exhaust passage to collect particulate matters in the exhaust gas by increasing the fuel injection amount, wherein the second target temperature which is used for the catalyst temperature retention control is set at the combustion temperature of the particulate matters.

* * * * *